Aug. 14, 1951 J. W. FITZGERALD ET AL 2,563,829
CABLE SEAL
Filed April 17, 1946 3 Sheets-Sheet 1
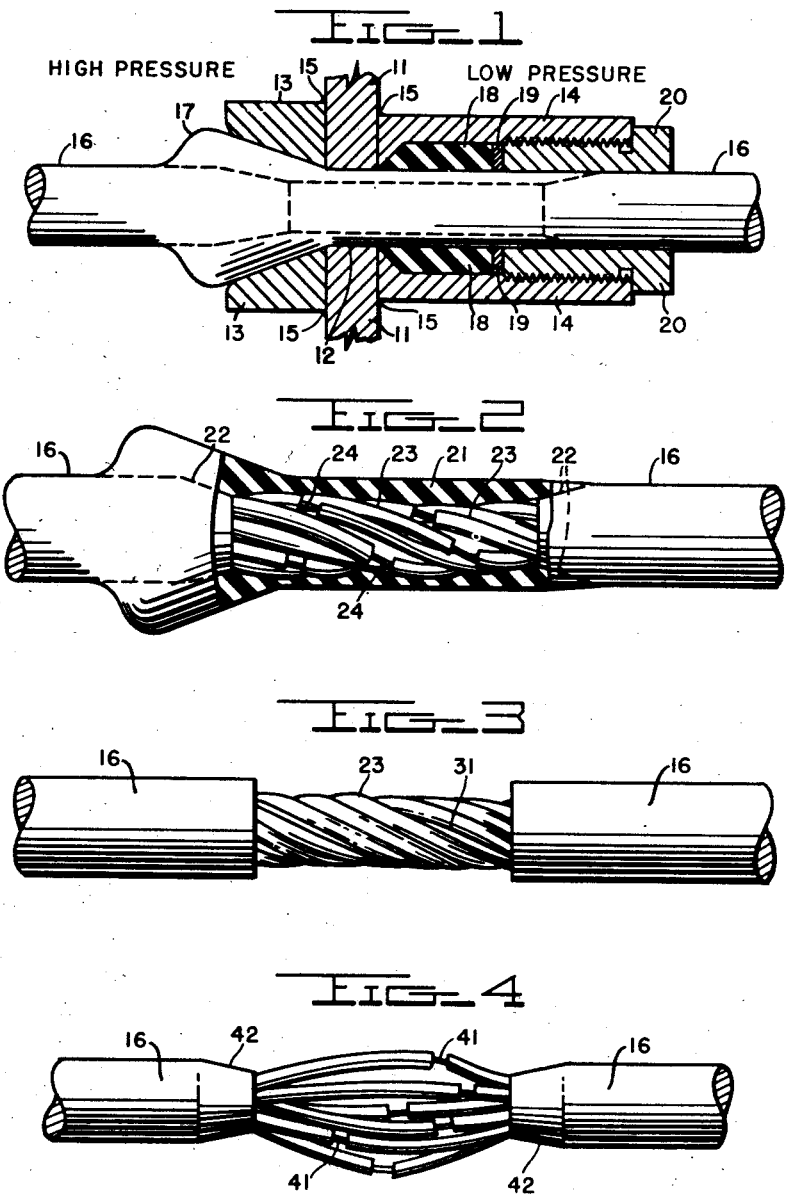
INVENTORS
JAMES W. FITZGERALD
BURTON G. HURDLE
BY CARLTON L. MORSE
ATTORNEY Aug. 14, 1951  J. W. FITZGERALD ET AL  2,563,829
CABLE SEAL
Filed April 17, 1946  3 Sheets-Sheet 2

INVENTORS
JAMES W. FITZGERALD
BURTON G. HURDLE
BY CARLTON L MORSE

ATTORNEY

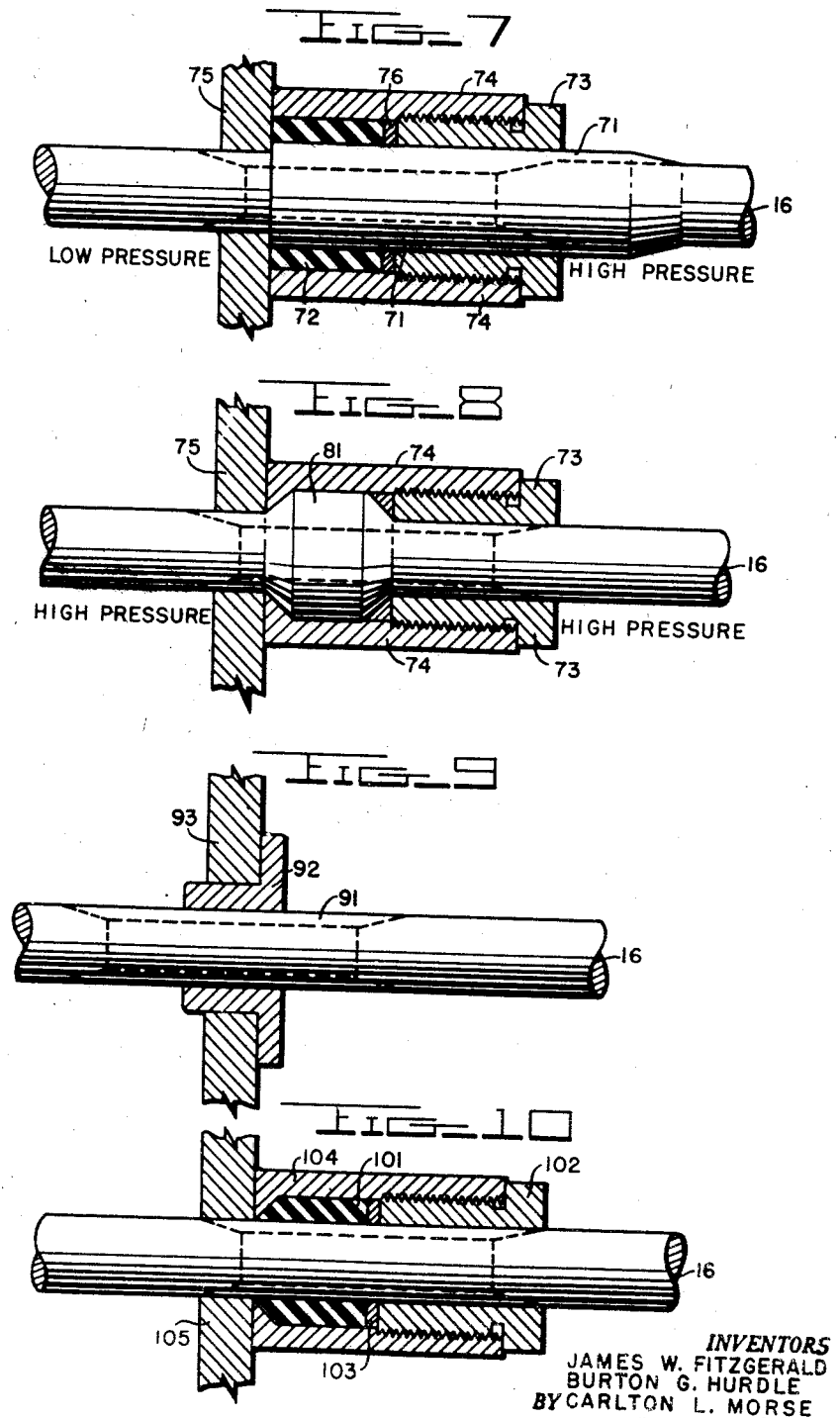

Patented Aug. 14, 1951

2,563,829

UNITED STATES PATENT OFFICE 2,563,829

CABLE SEAL

James W. Fitzgerald and Burton G. Hurdle, Washington, D. C., and Carlton L. Morse, United States Navy Application April 17, 1946, Serial No. 662,771

3 Claims. (Cl. 174—23)

(Granted under the act of March 3, 1883, as amended April 30, 1928; 370 O. G. 757)

This invention relates to seals for electrical cables. More particularly, it relates to seals for multiple-conductor cables.

In the past, numerous difficulties have been encountered in connection with passage of electrical cables through partitions separating different media, or through partitions over which there is a sharp pressure differential between like media. For example, in submarines, many multiple-conductor cables must be brought through the pressure hull into the sea water, and a pressure differential across the hull of 500 pounds per square inch is not unusual. Experience has shown that the principal difficulties are: leakage through the packing gland around the cable, flow through the interior of the cable, either around individual wires or between the insulation of individual wires and the cable casing, and axial slipping of the cable through the packing gland.

It is accordingly a first object of the present invention to provide an improved seal for multiple-conductor electrical cables at points of passage through partitions separating different media which will be useful and effective in preventing leakage of one medium into the other.

It is another object of the present invention to provide a seal for multiple conductor electrical cables at points of passage through partitions separating like media or different media between which there is a pressure differential.

It is a further object of the present invention to provide a seal for electrical cables at points of passage through partitions separating different media or like media which will prevent flow of one medium into the other through the interior of the cable or through its conductors.

It is still a further object of the present invention to provide a seal for multiple conductor electrical cables which will prevent axial motion of the cable through a partition separating media between which there is a pressure differential.

In accomplishing the objects of this invention the basic feature and novelty of the seal consists of a molded solid rubber or plastic section in the cable. This may be completed at the place of manufacture of the electrical equipment. However, the equipment required for making the molded seal is simple, and it may be easily made at the time and place of installation or maintenance of the electrical equipment.

Further features and objects of the invention will become clear from the following detailed description taken together with the accompanying drawings, in which:

Fig. 1 shows a longitudinal section of the general arrangement of one embodiment of the seal;

Fig. 2 is an exterior view of the solid rubber or plastic section, partly cut away to show details of the section, including the arrangement of parts of the original cable within the molded section;

Fig. 3, Fig. 4 and Fig. 5 show intermediate steps in the preparation of the molded section, Fig. 3 showing the removal of the outer rubber and cotton layers;

Fig. 4 shows sections of the spiral-stranded conductors which must be filled with solder;

Fig. 5 shows the section wrapped with uncured stock preparatory to molding;

Fig. 7 shows a slightly simpler seal with low pressure on the left;

Fig. 8 shows a mold shaped to prevent slipping in either direction when pressures are high on both sides of the partition;

Fig. 9 shows a simple molded section to which a metal collar has been bonded; and Fig. 10 shows a simple molded section held in place by pressure perpendicular to its axis.

Figure 5:
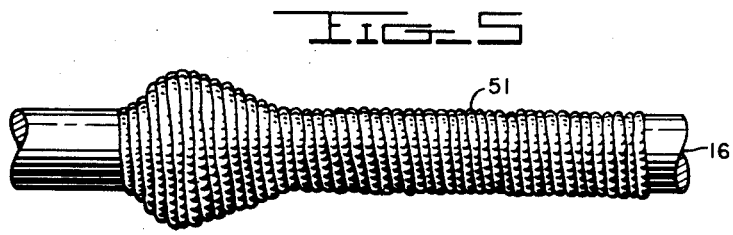

Attention is now invited to Fig. 1, which shows a seal for electrical cables. On the high-pressure side of partition 11 containing a circular aperture 12 is a cylindrical metal collar 13 having an aperture which decreases in size in the direction of the partition. On the low-pressure side is a cylindrical sleeve 14 internally threaded at the exterior end. Both collar 13 and sleeve 14 are fastened to partition 11 by welds 15. Axial movement of cable 16 is prevented by a bulge 17 in the molded section of the cable shaped to fit collar 13, and by sidewise pressure on the molded section by rubber washer 18 due to the incompressibility of the rubber and the pressure on the rubber washer transmitted by metal washer 19 from bushing 20 which has external threads screwed into the sleeve 14. The dotted lines indicate portions of the original cable.

Details of the molded section of cable are shown in Fig. 2. Part of the molded solid rubber or plastic section is cut away, revealing a longitudinal section 21 of added material, tapered portions 22 of the outer plastic covering of the original cable 16, insulated spiral-stranded conductors 23, and conductor sections 24 exposed by cutting away staggered sections of insulation.

Stages in the preparation of the molded section are shown in Figs. 3, 4, and 5. This molded section may be made by cutting away a section of the usual outer plastic covering, inner fabric insulation, and shielding. If the shield is braided, the small strands of the braid should be clipped close to avoid shorts. Fig. 3 also shows the individual plastic-covered conductors 23 and fiber spacer-cords 31. The fiber spacer-cords 31 are next removed. The shield may be made electrically continuous by inserting a short section of wire and soldering it to each end of the shield. This would not maintain the shielding properties over the two-inch section, but only the electrical continuity. If desired the shield could be replaced at a suitable stage in winding the rubber stock as hereinafter described.

The insulation may then be removed from short sections of the individual conductors, preferably staggered as shown in Fig. 4 to prevent short-circuiting. Each of the exposed sections 41 of spiral-stranded conductor is filled with solder to form a solid conductor of the width of the insulation over the exposed section. The solder thus forms a thickening layer to extend the radius of the single conductor to the radius of the conductor insulation. The soldering forms a discontinuity for the passage of fluids between conductor and insulator and provides a uniform surface for adhesion of rubber or other suitable plastic material. Adhesion may be further improved by brass-plating the conductors if desired. The outer plastic covering is now tapered back from the ends of the open section. The tapered sections 42 are roughened with a coarse file. All surfaces should be cleaned thoroughly with a suitable liquid cleansing agent. All exposed metal surfaces should then be coated with a rubber-to-metal cement. Two or three coats should be brushed on at intervals of at least thirty minutes. Then the plastic surfaces are given two or three coats of a plastic cement, or its equivalent, at suitable intervals, allowing each coat to dry thoroughly.

The rubber stock selected for making the mold should preferably have an accelerated curing rate and should have approximately the same physical properties as the outer covering of the cable. A piece of soft uncured stock of approximately the same size and shape as the center cord filling removed from the cable is cut and inserted in the center and the conductors twisted back into their original spiraling position, substantially as shown in the cut-away portion in Fig. 2. These conductors are equally spaced around the uncured center and worked into the soft stock. Then the seal is wrapped with uncured rubber until its diameter is slightly larger than that of the cable, as shown in Fig. 5. The rubber stock should be cut into thin strips 51 and wound tightly and uniformly. If replacement of the shield is desired, the seal may be wrapped until the diameter is the same as that of the cable shield, a shield section placed in position and soldered, and the wrapping with rubber stock completed. The wrapping may be continued until one end of the seal is of larger diameter than the other, and the seal has the shape shown in Fig. 5.

Figure 6:
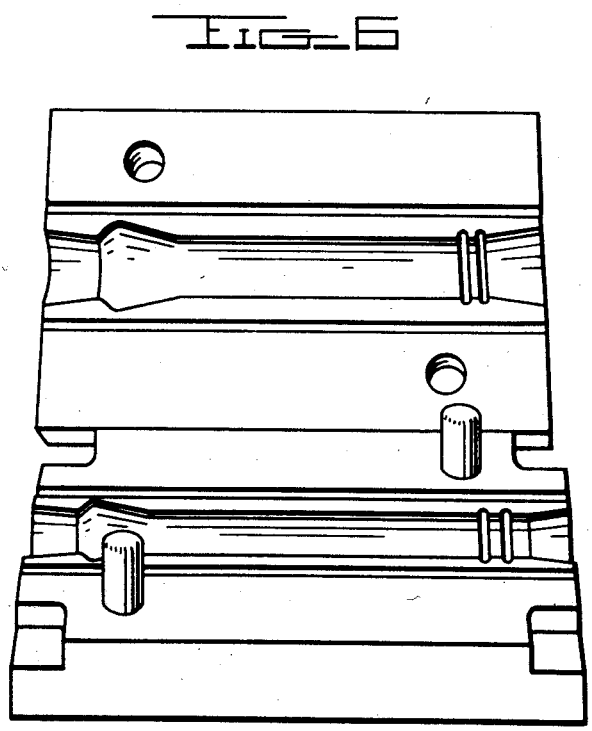
Fig. 6 shows a typical mold used in making the molded section of the seal.

The seal may be pre-formed by compressing in a cold mold such as that shown in Fig. 6, and any excess stock removed. The mold is then heated and the seal inserted. Pressure is applied for a time interval depending on the curing desired. The curing time, temperature, and pressure depend upon the stock used. When the curing is completed, the cable is removed from the mold and the flash cut away.

Modifications of the invention are shown in Figs. 7, 8, 9, and 10. Fig. 7 shows a high-pressure to low-pressure seal entirely on one side of the partition. The shape of the mold will prevent axial movement of the cable toward the low-pressure side of the partition. Axial movement toward the high-pressure side is prevented by sidewise pressure on the molded section 71 by rubber washer 72 when compressed by screwing externally-threaded bushing 73 into internally-threaded sleeve 74 which is welded to the wall 75. The rubber washer 72 is protected by a metal washer 76. Dotted lines indicate portions of the original cable.

A high-pressure to high-pressure seal is shown in Fig. 8. The parts are similar to those hereinbefore described except for the shape of the exterior 81 of the molded section. This is designed so that the motion of the cable axis in either direction would require shearing of the molded section rather than merely overcoming sidewise pressure due to compression. The bulge may be further modified to resemble a portion of a sphere, if desirable.

The seal shown in Fig. 9 consists of a straight molded section 91, similar to those previously described, bonded to a metal collar 92 which is inserted in and welded to the wall 93.

The seal in Fig. 10 is similar to those described above except that the exterior of the molded part is straight, and prevention of axial motion is due altogether to the action of rubber washer 101 on the cable. The rubber washer 101 is compressed against the cable by screwing bushing 102 into the sleeve 104. Metal washer 103 transmits pressure from the bushing 102 to the rubber washer 101. The sleeve 104 may be welded or otherwise suitably attached to the partition 105.

While certain preferred embodiments of the invention have been described for the sake of disclosure, it will be obvious to those skilled in the art that various changes and modifications thereof may be made without departing from the spirit of the invention. It is to be understood, therefore, that no limitations are intended other than those imposed by the scope of the following claims.

The invention described herein may be manufactured and used by or for the Government of the United States of America for governmental purposes without the payment of any royalties thereon or therefor.

What is claimed is:

1. In a sealed section of cable, a plurality of insulated single conductors having sections of exposed conductor, a thickening layer of solder on each exposed section extending the radius of the conductor to that of the conductor insulation, a plastic cement coating on each conductor, a soft plastic core in which the coated conductors are spirally impressed, and a molded outer covering of rubber bonded to the conductors and core.

2. The method of constructing a seal for multiple conductor electrical cable which includes exposing a short section of each conductor, thickening each section of exposed conductor with solder to a radius equal to that of the conductor insulation, covering each thickened conductor and its adjacent insulation with a plastic cement, inserting a soft uncured plastic core between the conductors, impressing and working the conductors spirally into the core, wrapping the assemblage with uncured rubber strips, cold forming the seal in a mold, and curing the seal by application of pressure in a hot mold.

3. In combination, a molded sealed section of cable having a plurality of insulated conductors with sections of exposed conductor, a thickening layer of solder on each exposed section extending the radius of the conductor to that of the conductor insulation, and a molded covering of rubber bonded to the conductors by a curing process.

JAMES W. FITZGERALD.
BURTON G. HURDLE.
CARLTON L. MORSE.

REFERENCES CITED

The following references are of record in the file of this patent:

UNITED STATES PATENTS

| Number | Name | Date |
| --- | --- | --- |
| 686,832 | Peachey | Nov. 19, 1901 |
| 2,091,824 | Lewis | Aug. 31, 1937 |
| 2,310,423 | Gold | Feb. 9, 1943 |
| 2,420,138 | Ingalls | May 6, 1947 |